United States Patent [19]
Burrell

[11] 3,884,431
[45] May 20, 1975

[54] CONVERTIBLE AIRCRAFT HAVING OPPOSITELY ROTATING ROTORS

[76] Inventor: Charles E. Burrell, 27 S. Sixth St., Shamokin, Pa. 17872

[22] Filed: Jan. 14, 1974

[21] Appl. No.: 433,063

[52] U.S. Cl. ............... 244/7 A; 244/7 C; 244/12 B
[51] Int. Cl. ......................................... B64C 27/24
[58] Field of Search ............ 244/6, 7, 8, 12 R, 12 B, 244/12 A, 17.11, 17.5, 17.19, 17.23, 17.27, 23 R, 23 B, 42 CC; 416/169, 170

[56]  References Cited
UNITED STATES PATENTS

| 977,997 | 12/1910 | Bertholf | 244/17.15 |
| 1,485,704 | 3/1924 | Pescara | 244/17.11 |
| 1,922,167 | 8/1933 | Leray | 244/6 |
| 2,518,008 | 8/1950 | Herrick | 244/7 A |
| 2,653,779 | 9/1953 | Terry | 244/7 R |
| 2,712,911 | 7/1955 | Herrick | 244/7 A |
| 3,127,129 | 3/1964 | Petrie | 244/23 B |
| 3,157,373 | 11/1964 | May et al. | 244/23 B |
| 3,246,862 | 4/1966 | Celniker et al. | 244/7 R |
| 3,563,496 | 2/1971 | Zuck | 244/17.19 |

FOREIGN PATENTS OR APPLICATIONS

| 580,887 | 11/1924 | France | 244/7 A |

Primary Examiner—Trygve M. Blix
Assistant Examiner—Galen L. Barefoot
Attorney, Agent, or Firm—Morris Liss

[57] ABSTRACT

A fuselage supports vertically oriented telescoping shafts that mount oppositely rotating rotors. The rotors are set into motion during vertical take-off of the craft, in a manner similar to helicopter operation. Rotor operation then terminates and the rotors are aligned with a third wing which is non-rotatable. The aircraft can then travel as a regular fixed wing aircraft. Vertical booster jets provide stabilization during take-off and landing.

3 Claims, 14 Drawing Figures 3,884,431

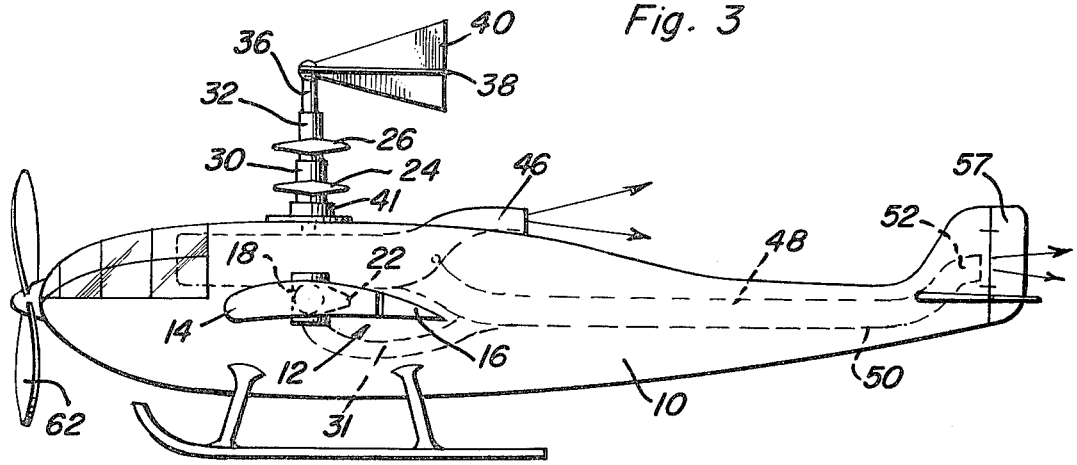
Fig. 3
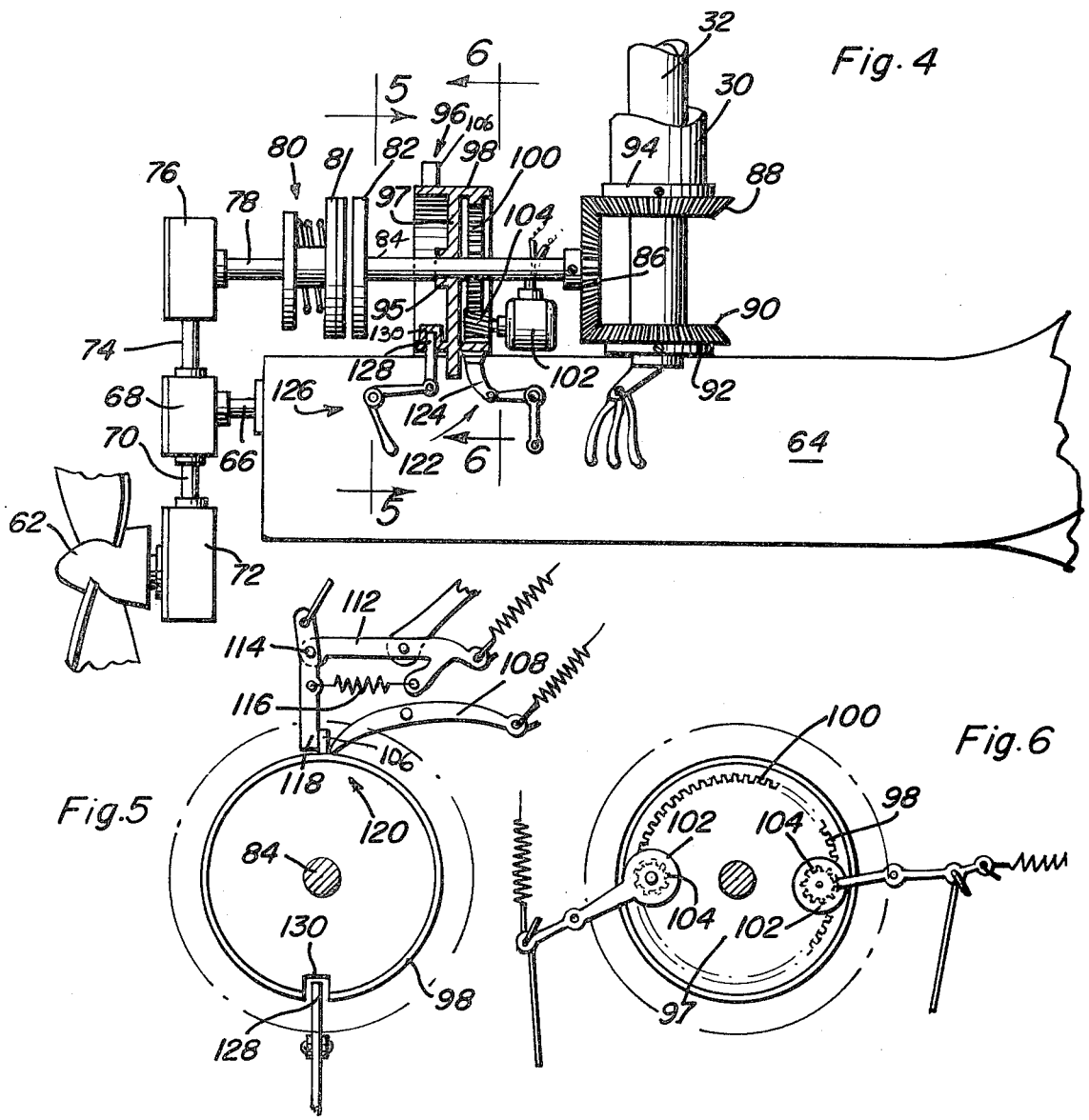
Fig. 4
Fig. 5
Fig. 6

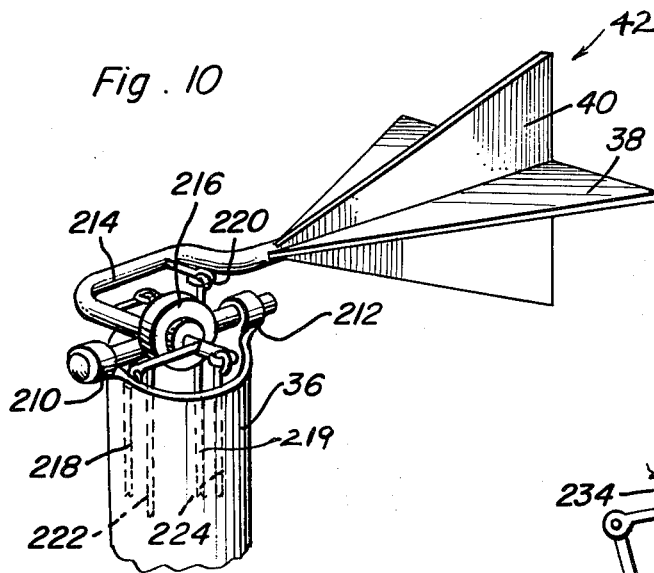
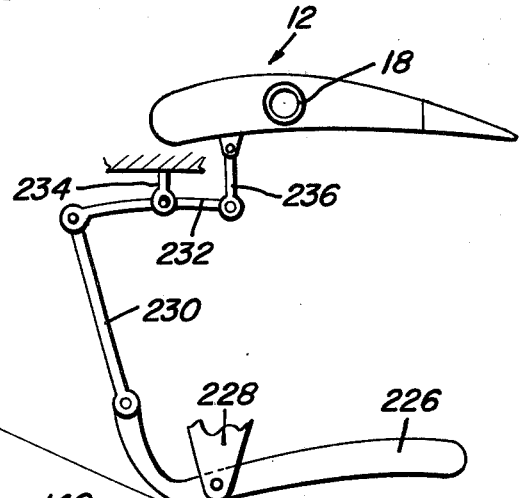
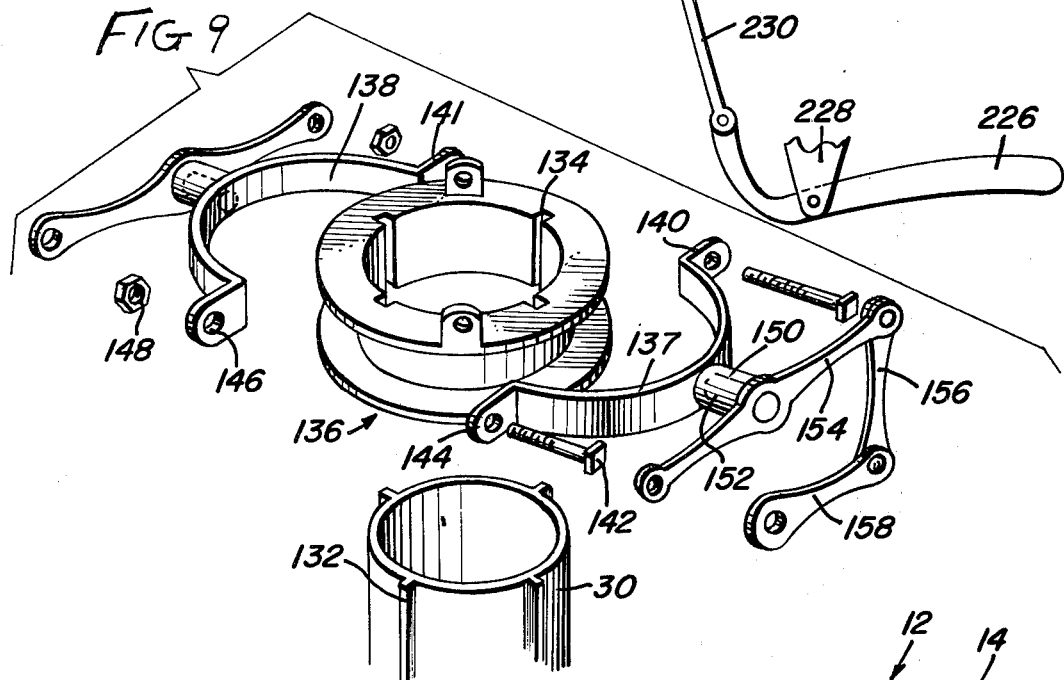
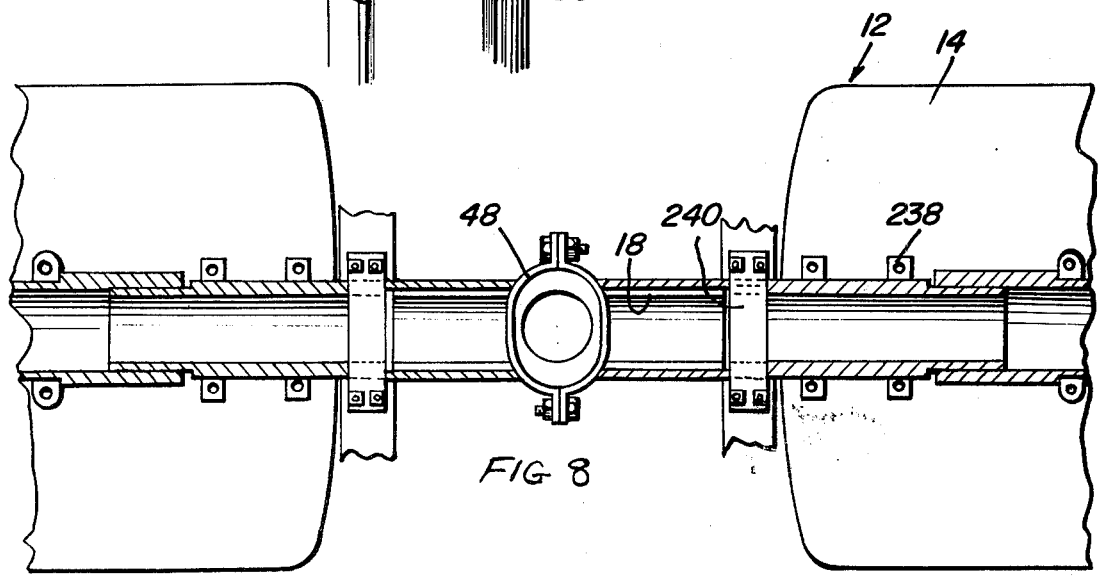

3,884,431

CONVERTIBLE AIRCRAFT HAVING OPPOSITELY ROTATING ROTORS

FIELD OF THE INVENTION

The present invention relates to convertible aircraft, and more particularly to an aircraft that may be converted from helicopter to normal airplane operation.

BRIEF DESCRIPTION OF THE PRIOR ART

The prior art includes the design which will permit an aircraft to be converted between helicopter and normal plane operation. In many of the prior art designs, a single fixed rotor is employed with a fixed wing. During helicopter operation, the rotor is set into operation to effect vertical take-off and landing. Once the aircraft has taken-off, the rotor is aligned with the fixed wing so that the aircraft can continue its flight as a normal plane. One basic problem with such prior art designs resides in the high output requirements of the aircraft's power plant, due to the existence of fixed wing and a rotor. In addition, the prior art designs have included rather complicated means for aligning a rotor blade with a fixed wing after an aircraft has taken-off. In the past, electro-magnetic systems have been used to sense the position of the rotor and ensure that it is disposed in precise aligned relation with the fixed wing, when this relationship is required.

An additional problem of the prior art resides in the rapid descent of convertible aircraft, in the event that there is a power interruption. This is a particular problem with convertible aircraft due to the weight of the rotor and fixed wing components.

BRIEF DESCRIPTION OF THE PRESENT INVENTION

The present invention is an improvement of the prior art convertible aircraft designs, previously discussed. Instead of the single rotor, two rotors are employed which operate in opposite rotational senses to add great stability to the aircraft. Means are provided for changing the angle of incidence of the rotor blades to maximize flight characteristics during changes of craft velocity and wind conditions. A wing is provided to provide a basic wing structure to the craft when it is operating as a normal plane. However, the wing is divided in two parts, mounted on a single shaft so that the wing may have its angle of incidence changed, selectively, to optimize flight characteristics.

A relatively simple mechanical assembly is employed to change the orientation of the rotor to an aligned condition with respect to the wing, when the craft operates as a normal plane. This eliminates the need for complicated electro-magnetic devices which presents a greater reliability problem.

Exhaust gases from the power plant of the aircraft is used for jet propulsion. A portion of the exhaust gas is directed against stabilizing surfaces such as ailerons while a second portion of the exhaust gas is used merely for horizontal propulsion. A further portion of the exhaust gas is used during take-off and landing. Jet boosters, fixed to the outward end of the craft wings provide vertical thrust when required for stabilization.

As a safety feature, a small wing assembly is mounted to an upper part of the craft and provides an effective wing surface, in the event there is a brief power shortage, or failure. Wind resistance against this wing assembly, during rapid descent of the craft will provide flight supporting forces, until the power problem can be corrected.

The design of the present aircraft can accommodate several types of power plants. As will be appreciated hereinafter, the craft may use an internal combustion engine or jet engines.

The above-mentioned objects and advantages of the present invention will be more clearly understood when considered in conjunction with the accompanying drawings, in which:

BRIEF DESCRIPTION OF THE FIGURES

FIG. 3 is a side elevational view of the aircraft.

FIG. 4 is a partial sectional view illustrating a power train to the rotors of the aircraft.

FIG. 5 is a sectional view taken along a plane passing through section line 5—5 of FIG. 4.

FIG. 6 is a sectional view taken along a plane passing through section line 6—6 of FIG. 4.

FIG. 7 is a view illustrating a linkage assembly for controling the pitch of the aircraft wing.

FIG. 8 is a partial sectional view transversely through the fuselage to illustrate an exhaust gas conduit passing through the wing of the aircraft.

FIG. 9 is a disassembled view of a split ring assembly employed to mount a rotor of the aircraft to a rotating drive shaft.

FIG. 10 is a perspective view of a wing assembly that is used to decrease descent of the aircraft during a power failure.

DETAILED DESCRIPTION OF THE INVENTION

Figure 1:
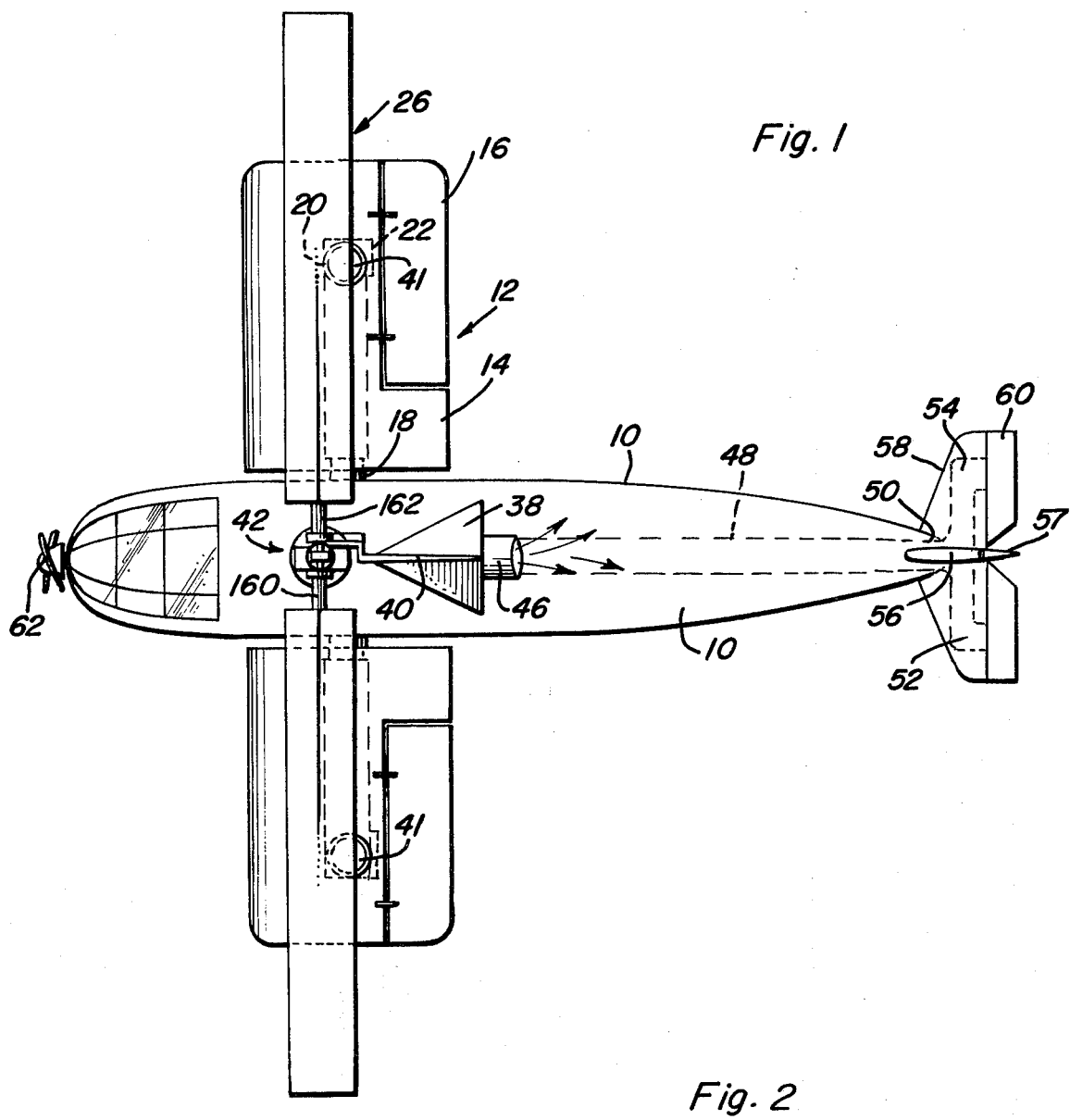
FIG. 1 is a top plan view of the present aircraft.

Referring to the figures and more particularly FIG. 1, the aircraft is seen to include a conventional fuselage 10 having a wing 12 extending transversely from the fuselage. Actually, the wing includes right and left components, including a generally L-shaped body 14 and an aileron 16. The right and left wing components are fixedly mounted to a rotatable shaft 18 which permits the wing position to be angularly varied so that a pilot may select an angle of incidence. Conduits 20 are telescopingly mounted over the shaft 18 to permit the flow of exhaust gas therethrough. An exhaust port 22 is disposed at the end of the conduit, the exhaust port being perpendicularly oriented with respect to the major length of the conduit. Exhaust gases are directed against the ailerons 16, thus contributing to the flight control of the craft.

Figure 2:
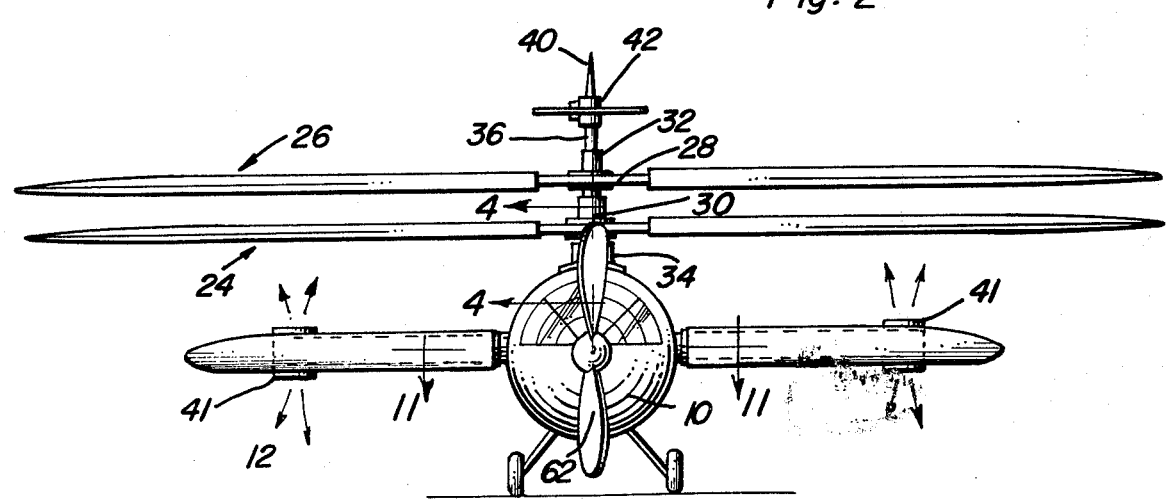
FIG. 2 is a front elevational view of the aircraft.

As clearly shown in FIG. 2, above the wing 12 are two identical rotor blades 24 and 26 that are vertically spaced from one another and which rotate in opposite directions when operating. The rotors may have their angle of incidence selectively changed by rotating a mounting shaft, such as shaft 28, which is connected to the rotor 26.

Referring to FIGS. 2 and 3, a first telescoping shaft 30 is seen to support the rotor 24. A second smaller telescoping shaft 32, disposed radially inwardly of the shaft 30, supports the rotor 26. A third telescoping shaft 36 is positioned within the telescoping shaft 32 and is disposed above it. This last mentioned shaft mounts a wing assembly generally indicated by reference numeral 42 in FIG. 1. The wing assembly is auxiliary to the wing 12, and decreases rapid descent of the aircraft should a power failure occur. The auxiliary wing assembly is comprised of a vertical stabilizing wing 40 and a horizontal stabilizing wing 38.

In the event the aircraft utilizes a jet engine, an outlet conduit 46 may be provided in a rearwardly facing direction to lend forward thrust to the aircraft during horizontal flight. A centrally located conduit 48 is positioned along the rearward interior length of the aircraft. As will be seen in FIG. 1, the conduit 48 branches out to a T-section comprising branches 52 and 54 that direct the exhaust gases against the elevators 60. Section 58 represents a fixed tail section. A vertical stabilizer includes a fixed vertical member 56 and a movable rudder 57. It should also be noted that instead of jet propulsion, the aircraft may be equipped with a conventional propeller 62, or a plurality of propellers.

Referring to FIG. 4, an engine block is indicated by 64. The output drive shaft 66 is connected to a gear box 68 which in turn has a output shaft 70 that is connected to a second gear box 72. The output shaft from the second gear box 72 is connected to the propeller 62 to cause rotation thereof. A second output shaft from the gear box 68 is generally indicated by reference numeral 74 and will be seen to be connected to a gear box 76. The output drive shaft 78 from this latter mentioned gear box mounts a first clutch plate 81 of a clutch assembly generally indicated by reference numeral 80. A second clutch plate 82 is mounted to a drive shaft 84. At an opposite end of this shaft is a driving bevel gear 86 that meshes with the drive bevel gears 88 and 90. These latter mentioned gears rotate in opposite directions. A hub 92 positions the bevel gear 90 in place, while a second hub 94 does the same for the bevel gear 88. The bevel gears 88 and 90 respectfully drive shafts 30 and 32. With the clutch plates 81 and 82 engaged, the rotors 24 and 26 are rotated. However, after the aircraft has taken off vertically, it may be desirable to convert the aircraft to a normal airplane operation. This necessitates that the rotors cease rotation and become aligned with the wing 12. In order to accomplish this positioning of the rotors, a positioner 96 is employed. The positioner is in the form of a wheel having an annular flange 98 and a central circular web or flange 97. A circular gear 100 is formed in the inner side of the flange 98. This gear meshes with the spur gear 104 that is connected to the output of the motor 102. If additional driving power is required, a pair of motors 102 with respective spur gears 104 may be used, as shown in FIG. 6.

Reference is made to FIGS. 4 and 5 which illustrate the mechanism for positioning the rotors in alignment with the wing 12. Initially, the rotors may be driven during helicopter operation of the craft by completing a power train through the clutch 80. When the rotors are to be positioned, the clutch plates 81 and 82 separate and controller 96 rotates freely, due to keying of the controller 96 to the shaft 84 by means of a cotter pin 95, key, or the like. A projection 106 extends radially outwardly from the annular flange 98. As shown in FIG. 5, when the controller rotates counterclockwise, the projection 106 will lift the linkage 108 upward until it passes the linkage and engages a linkage stop 118 which is pivotally connected to a perpendicularly oriented controlling lever while the pivot point between the two levers is indicated by 114. A spring 116 maintains intimate contact between the stop lever 118 and the linkage 112. As a result, the projection 106 comes to rest at a preselected point. The shaft 84 being fixed to the controller 96, likewise assumes a predetermined angular position. Reference character 120 denotes the preselected position of the projection 106.

Figure 12:
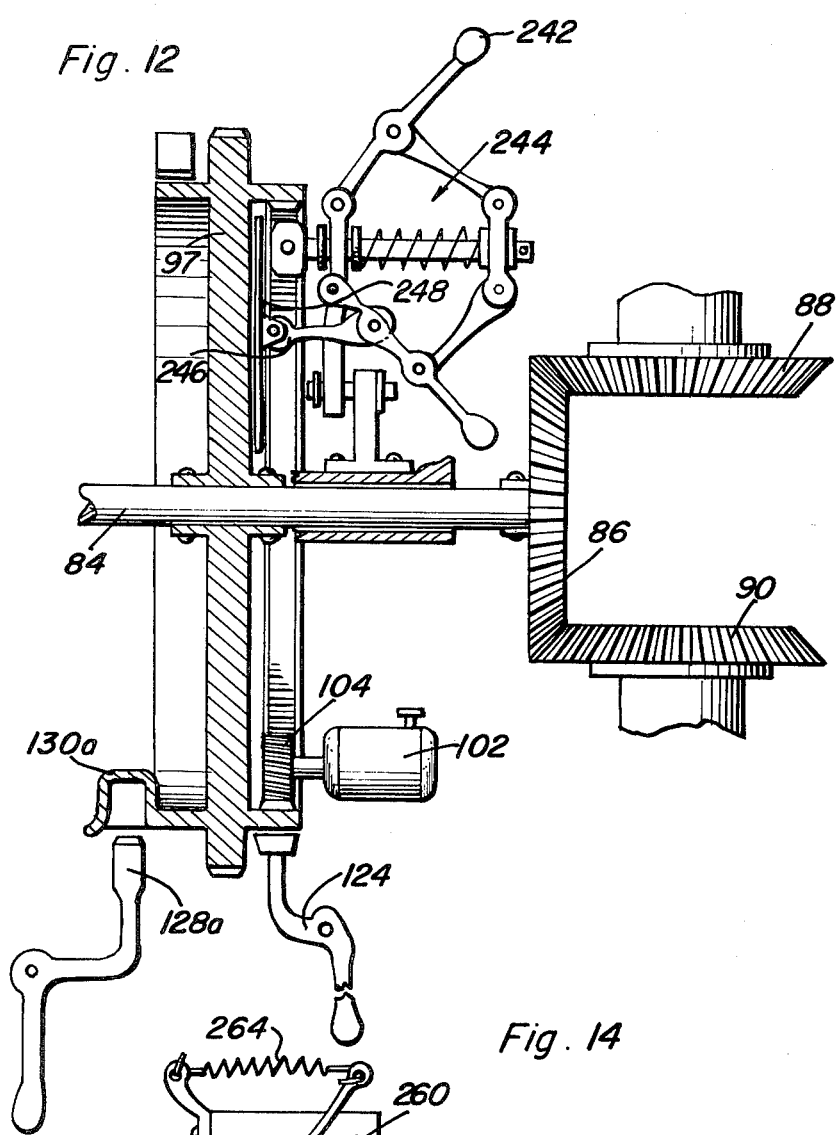
FIG. 12 is a view illustrating means for positioning the rotor blades in alignment with the aircraft wing during normal flight of the aircraft.

In order to slow down the positioner 96, a frictional brake generally indicated by reference numeral 122 (FIG. 4), is provided due to the fact that the rotors encounter substantial wind resistance when the aircraft undergoes normal airplane operation. In order to ensure rigidification of the rotors, a mechanical stop is used. This mechanism is generally indicated by reference numeral 126 and includes a link 128 that is received within slot 130, as shown in FIG. 5. The slot is formed in the circular flange 98 of the positioner 96. An alternate positioner is illustrated in FIG. 12. In this figure, similarly functioning components are denoted by corresponding reference numerals. In addition to the brake lever 124, a second larger brake assembly is utilized. A control lever 242 rotates with a number of linkages generally indicated by reference numeral 244. The linkages are finally connected to an end rod 246 that pivotally mounts a brake shoe 248 which cooperates with the web 97 of the positioner to effect frictional braking of the positioner when desired.

It should be mentioned that during take off and landing, the present invention includes (FIG. 2) vertically mounted booster jets 41. In order to aid the aircraft during take off and landing, these mentioned jets 41 are positioned at the outward ends of the conduits 20. These jets may be selectively energized by means of solenoid valves, or the like. The jets are primarily used for stabilization.

Referring to FIG. 9, means for securing linkages, to which the rotors are connected, will be explained. The illustrated split ring coupling permits variation of the angle of incidence of the rotors 24 and 26. The illustrated shaft 30 has longitudinally oriented splines 132 running along its length. Mating keys 134 are formed at corresponding positions along the inside wall of the ring member 136. Semi-circular clamps 138 intimately engage the external cylindrical surface of the ring 136. Ears 140 and 141 become align to permit the passage of a fastener therethrough. Similarly, the ears 144 and 146 become aligned so that the bolt 142 passes therethrough and is secured by a nut 148. The hub 152 of a linkage 154 is pivotally mounted upon a pintle 152 that extends radially outwardly from the semi-circular member 137. Linkage arms 156 and 158 are coupled to the linkage member 154 to cause pivotal motion thereof. As will be seen in FIG. 11, two split-ring connectors are employed on the rotor assembly.

FIG. 10 illustrates a universal joint assembly that mounts the wing assembly 42, previously discussed in connection with FIGS. 1–3. A clevis 210 mounts a shaft 212 that undergoes rotation in a first plane. A generally U-shaped shaft 214 is connect to a second pivotal member 216 to permit rotation of the wing assembly 42 in an orthogonal plane. A first control wire 218 is connected to the shaft 214 while a second wire 219 is also connected to the shaft but is capable of returning the wing assembly in an opposite rotational direction. The upper end of the wire 219 is connected to the shaft 214 by means of a hook connection as illustrated by 220. Similarly, a pair of guide wires 222 and 224 can cause the rotation of the wing assembly in a second dimensional plane.

FIG. 7 illustrates a simple linkage system for changing the angle of incidence of the wing 12. A control lever handle 226 is pivotally mounted to clevis 228. An additional straight linkage 230 is pivotally connected to a further linkage 232 which is pivotally mounted at 234. A shortened linkage 236 completes a linkage connection between the control handle 226 and the wing 12. Actuation of the control lever 226 causes rotation of the wing about the shaft 18.

FIG. 8 specifically shows the mounting of the wing sections to the shaft 18. As will be shown in the figure, the shaft 18 is secured to the wing sections by brackets 238. Journal blocks 240 are provided as bearing supports for the rotatable shaft 18.

Figure 11:
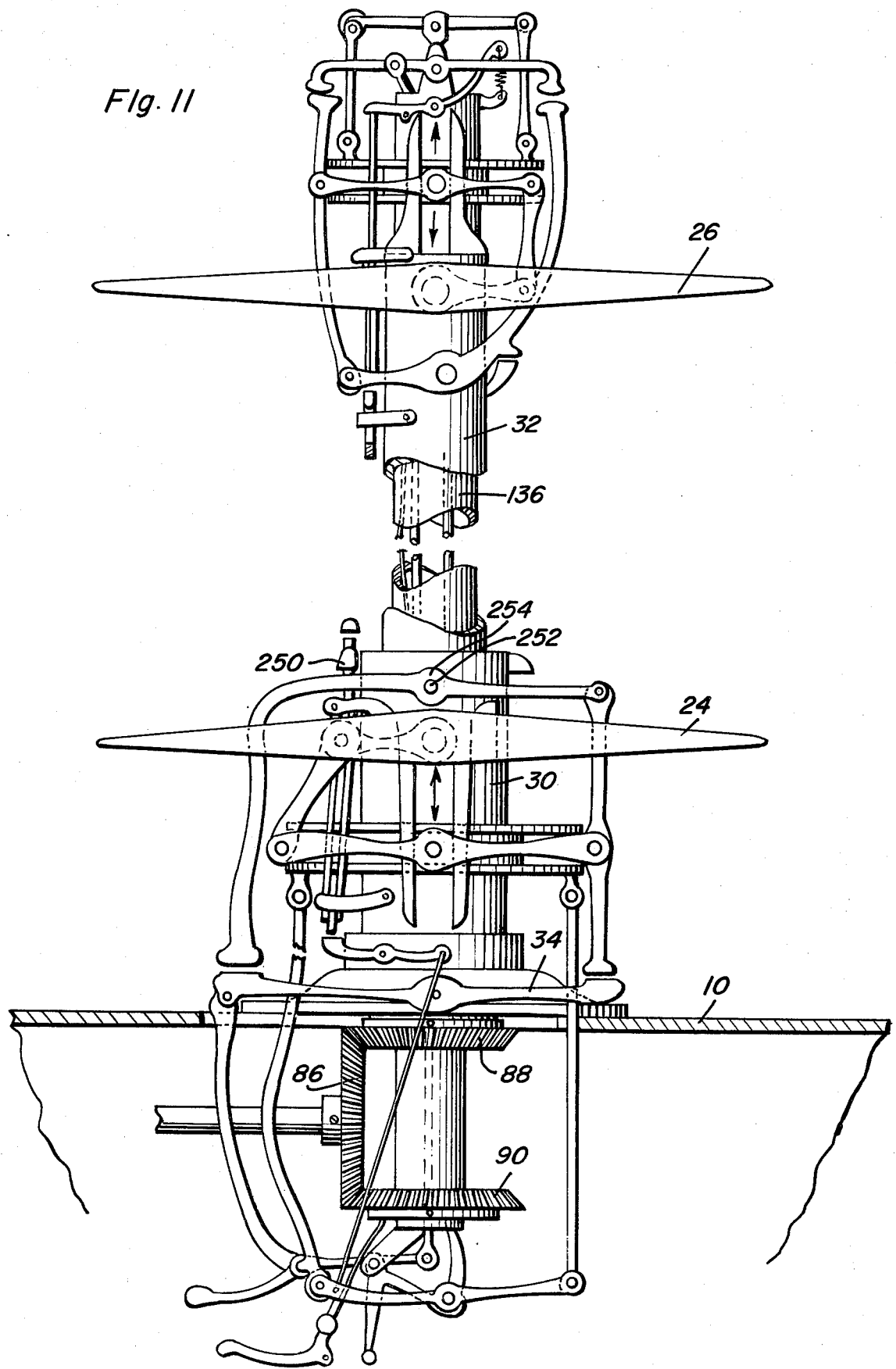
FIG. 11 illustrates the mechanical components that couple the power train to two individual rotors. The mechanical components adjust the position of the rotors during flight.
Figure 13:
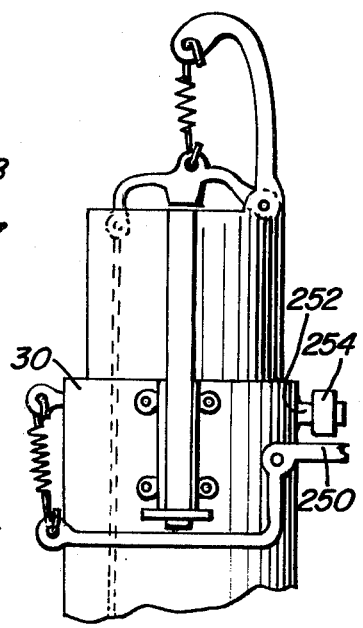
FIG. 13 is a partial view of an upper portion of the assembly illustrated in FIG. 11.

FIG. 13 illustrates a portion of the linkage assembly, that is more specifically shown in FIG. 11. The linkage 250 is limited in its pivotal displacement by the perpendicularly oriented linkage 254.

Figure 14:
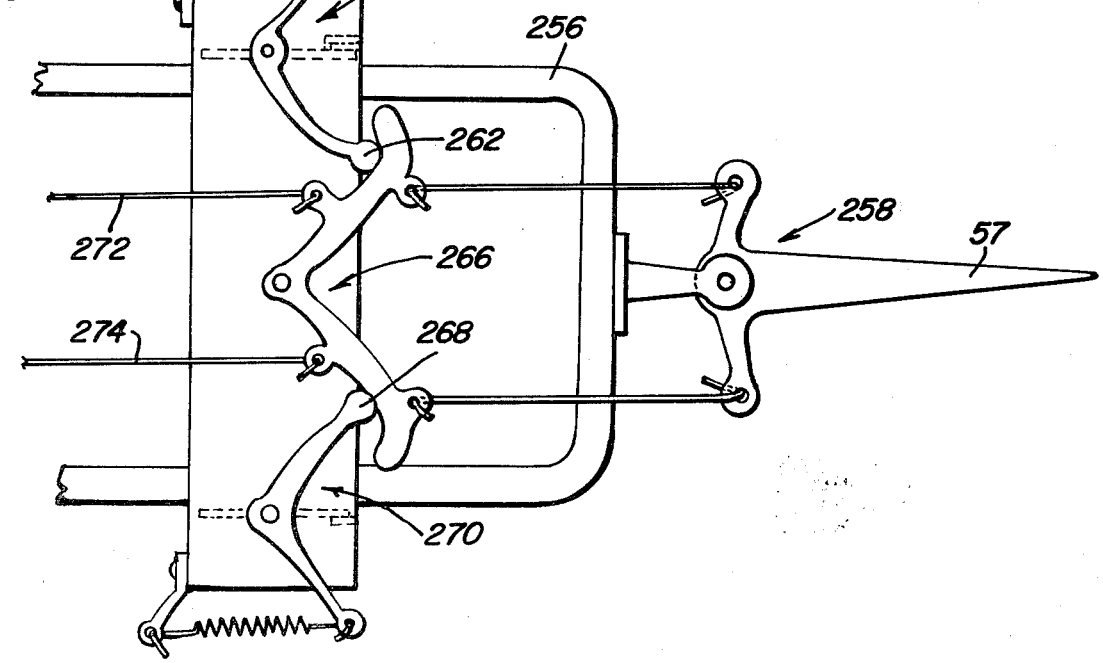
FIG. 14 is a partial view illustrating a linkage system for varying the angle orientation of a vertical tail member.

Reference is made to FIG. 14 which illustrates a compound linkage assembly for controlling the angular orientation of the rudder 57. A support frame 256 mounts a pivotally supported linkage 258 that has the rudder 57 integrally connected therewith. A first bell crank 260 has a cam element 262, contacting the follower surface on a second bell crank 266. The spring 264 normally maintains the mechanical components in the illustrated position. A symmetrical situation exists with the cam element 268 of the bell crank 270. A control wire 272 is connected to the bell crank 266 to pull the rudder 57 in a first rotational displacement. A second control wire 274 is also connected to the bell crank 266 and exerting force on this wire will cause the rudder 57 to undergo angular displacement in an opposite direction.

Thus, with the invention described it will be appreciated that the present convertible aircraft provides a great latitude of flexibility during flight operation.

It should be understood that the invention is not limited to the exact details of construction shown and described herein for obvious modifications will occur to persons skilled in the art.

Wherefore I claim the following:

1. A convertible aircraft comprising:
a fuselage;
a wing movably mounted to the fuselage for permitting variations of the angle of incidence of the wing;
at least two rotors mounted in vertically spaced relation for rotating in opposite directions to achieve helicopter operation of the aircraft;
source means for powering the aircraft;
means connected between the fuselage and the rotors for supporting the rotors;
drive train means connected between the power source means and the supporting means for selectively rotating the rotors;
an auxiliary wing assembly having horizontal and vertical components, the assembly being mounted on the supporting means for decreasing the rate of descent of the aircraft during a power interruption;
selective means connected to the drive train means for positioning the rotors in alignment with the wing during normal flight of the aircraft, the selective means comprising:
a wheel fixedly mounted to a shaft portion of the drive train;
means for rotating the wheel to a preselected position corresponding to alignment of the rotors;
a projection extending from the wheel;
first means manually actuated for engaging the projection; and
second means manually actuated for engaging a slot in the wheel.

2. A convertible aircraft comprising:
a fuselage;
a wing movably mounted to the fuselage for permitting variations of the angle of incidence of the wing;
at least two rotors mounted in vertically spaced relation for rotating in opposite directions to achieve helicopter operation of the aircraft;
source means for powering the aircraft;
means connected between the fuselage and the rotors for supporting the rotors;
drive train means connected between the power source means and the supporting means for selectively rotating the rotors;
an auxiliary wing assembly having horizontal and vertical components, the assembly being mounted on the supporting means for decreasing the rate of descent of the aircraft during a power interruption;
selective means connected to the drive train means for positioning the rotors in alignment with the wing during normal flight of the aircraft;
control means connected between the rotors and the support means for pivotally mounting the rotors to the supporting means thus permitting variations of the angle of incidence of the rotors;
means mounted on the wing for selectively exhausting gas downwardly toward the ground for stabilization of the craft, and further wherein the supporting means comprises a plurality of telescoping hollow cylinders capable of rotating within one another, each of the rotors being mounted to one of the cylinders;
gear means respectively connected between the drive train means and the cylinders for rotating in opposite directions, and further wherein the selective means comprises:
a wheel fixedly mounted to a shaft portion of the drive train;
means for rotating the wheel to a preselected position corresponding to alignment of the rotors;
a projection extending from the wheel;
first means manually actuated for engaging the projection; and
second means manually actuated for engaging a slot in the wheel.

3. The subject matter of claim 2 together with first and second conduit means located within the wing, the inlet end of each conduit means communicating with the power source means while the outlet end of each conduit means is disposed adjacent a wing aileron for directing exhaust gases from the source means against the ailerons thus providing further control of the aircraft, and further wherein third conduit means located within the fuselage, the inlet end of which communicates with the source means while the outlet end of the third conduit means is disposed adjacent the elevators of the aircraft tail thereby providing further control of the aircraft, and still further wherein the first and second conduit means are concentrically connected with shaft means for movably mounting the wing.

* * * * *